Dec. 17, 1957 A. SENKOWSKI ET AL 2,816,456
BRAKE LATCH MECHANISM
Filed Oct. 14, 1953 2 Sheets-Sheet 1
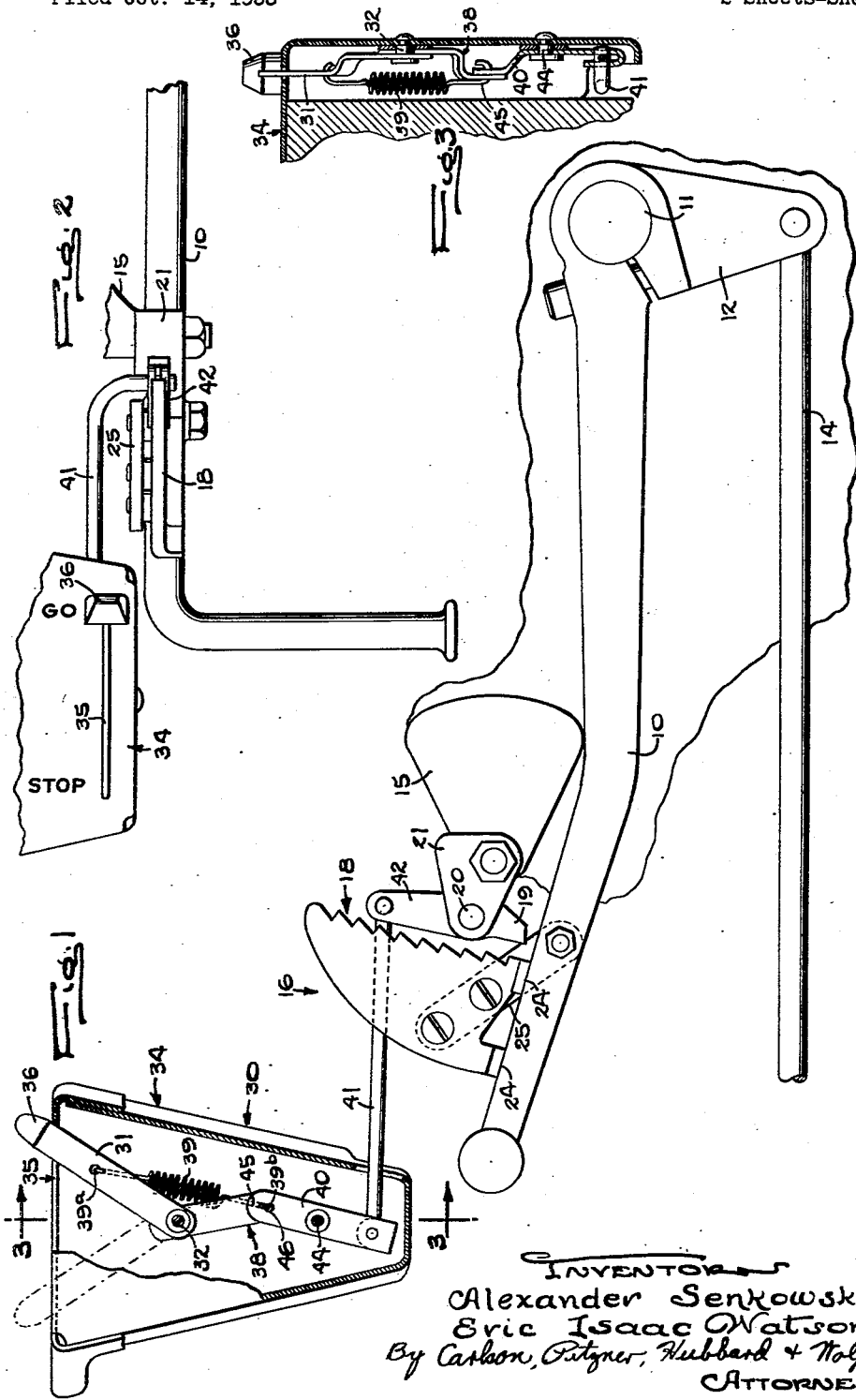
INVENTORS
Alexander Senkowski
Eric Isaac Watson
By Carlson, Pitzner, Hubbard & Wolfe
ATTORNEYS Dec. 17, 1957   A. SENKOWSKI ET AL   2,816,456
BRAKE LATCH MECHANISM
Filed Oct. 14, 1953   2 Sheets-Sheet 2
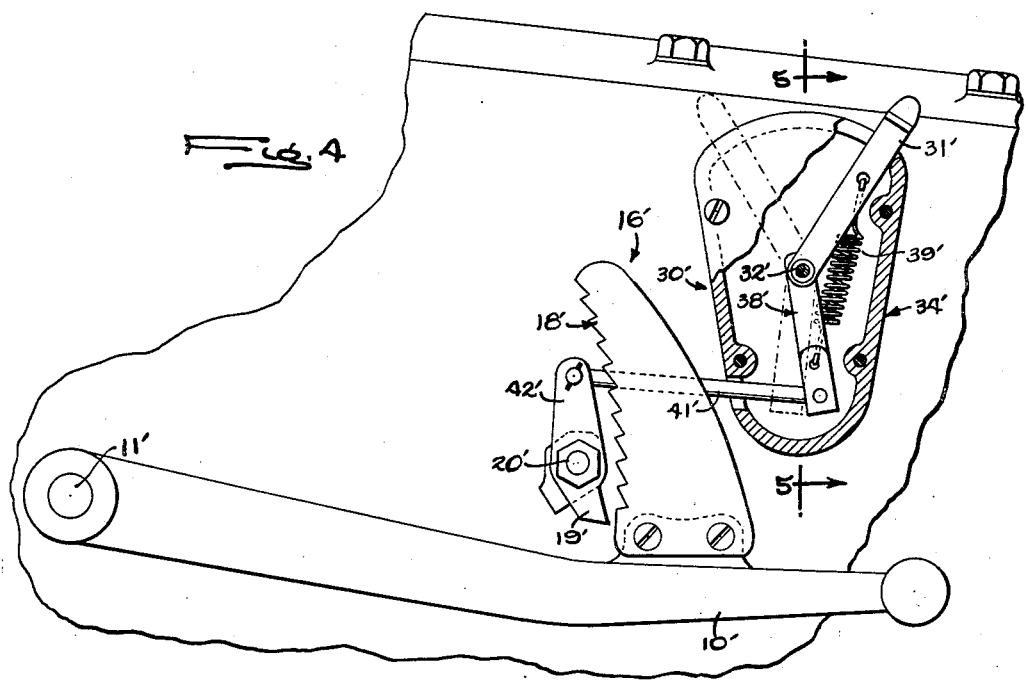
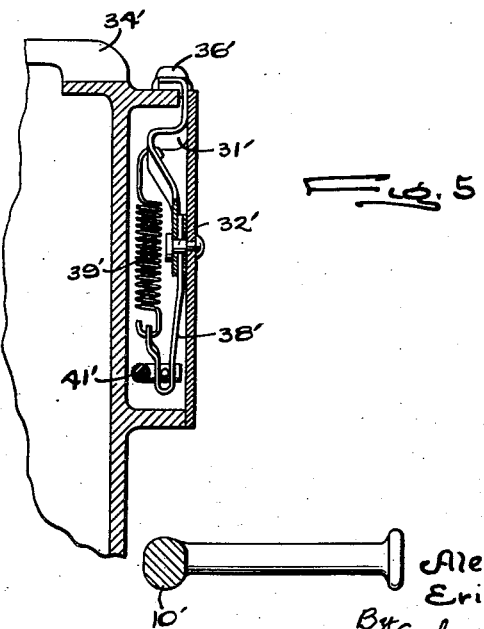
INVENTORS
Alexander Senkowski
Eric Isaac Watson
By Carlson, Pitzner, Hubbard + Wolfe
ATTORNEYS

United States Patent Office 2,816,456
Patented Dec. 17, 1957

2,816,456
BRAKE LATCH MECHANISM

Alexander Senkowski, Coventry, and Eric Isaac Watson, Solihull, England, assignors to Massey-Harris-Ferguson (Sales) Limited, a British company Application October 14, 1953, Serial No. 386,002

Claims priority, application Great Britain October 17, 1952

1 Claim. (Cl. 74—540)

This invention relates to a mechanism for latching the brakes of vehicles, such as farm tractors, for example, and more particularly to an improved control arrangement for setting and releasing such a latching mechanism.

In many farm tractors, it has been the practice to provide a latching mechanism for latching the brake pedal or actuator in its "brakes-on" setting. One known form of brake latching mechanism includes a movable pawl, pivoted to the brake pedal, and a cooperating ratchet toothed rack mounted in a fixed position on the tractor. In this construction, the pawl is movable by direct finger manipulation into and out of engagement with the rack, so that the brakes may either be latched or released. Such a brake latching contrivance is simple to make and operate and is effective if properly handled. However, there is a possibility that the pawl may inadvertently be disengaged from the rack by a careless or unskilled tractor driver. This will occur if the driver accidentally steps on the brake pedal, whereupon the latching mechanism will be released and the pedal will return to the "brakes-off" position, by virtue of the usual spring return action.

It is an object of the present invention to provide a brake latching mechanism which may be set and released by a snap action and which will be maintained in either the set or released condition without substantial danger of accidental change over. In particular, it is an object of the invention to provide a brake-latch mechanism of the foregoing character which will maintain the brakes latched in the "brakes-on" setting until the latching mechanism is manually released.

A further object of the invention is to provide a brake latching mechanism which will not be released by any inadvertent movement of the brake actuator.

Still another object of the invention is to provide a brake latching mechanism which is simple, fool proof, safe, inexpensive to manufacture, and effective in operation.

Further objects and advantages of the invention will appear from the following description, taken with the accompanying drawings, in which:

Figure 1 is a general elevational view, partly in section, of an exemplary brake latching mechanism embodying the invention.

Fig. 2 is a fragmentary plan view of the brake latching mechanism shown in Fig. 1.

Fig. 3 is a fragmentary elevational sectional view taken generally along a line 3—3 in Fig. 1.

Fig. 4 is an elevational view, partly in section, of a modified brake latching mechanism embodying the invention.

Fig. 5 is a fragmentary vertical sectional view taken generally along a line 5—5 in Fig. 4.

While particular embodiments of the invention have been shown in the drawings and will now be described in some detail, there is no intention to limit the invention to the details of the embodiments. On the contrary, the intention is to cover all modifications, alternative embodiments, usages and equivalents which fall within the spirit and scope of the invention as expressed and defined in the specification and appended claims.

The brake latching mechanism of Figs. 1–3 is shown in connection with a farm tractor having a brake system including an actuator in the form of a brake lever or pedal 10 extending rearwardly on the tractor from a shaft 11. Fixed to the shaft 11 is an arm 12 connected to a brake actuating rod 14, which may be employed to operate one or more wheel brakes (not shown). By means of a return spring (not shown) the pedal 10 is normally held upwardly against a stop bracket 15. This type of brake pedal is conventional on many tractors.

To latch the brake pedal 10 with the brakes partially or fully set, the brake system comprises a latching mechanism 16 including a pair of relatively movable interengageable latching elements in the form of a ratchet toothed rack plate 18, mounted on the brake pedal 10, and a ratchet pawl 19 swingable on a pivot 20 carried by a bracket 21. This bracket 21 may be mounted in a fixed position on the tractor, and in this instance is mounted on the stop bracket 15. In the illustrated construction, the ratchet plate 18 is provided with surfaces 24 which abut against the brake pedal 10. A strap 25 is utilized to secure the ratchet plate 18 to the brake pedal 10.

Provision is made for selectively moving the pawl 19 into and out of engagement with the ratchet plate 18, so that the latching mechanism 16 may either be set or released. To this end, the latching mechanism is provided with a control mechanism 30 adapted to bias the pawl 19 by spring action, either toward or away from the ratchet plate 18. The illustrated control mechanism 30 comprises a selector element in the form of a hand lever 31 which is swingable about a horizontal pivot 32 mounted on a casing 34. The latter may be secured to the tractor in a fixed position. At its upper end, the control lever 31 extends through a slot 35 formed in the casing 34. A knob or head 36 is mounted on the upper end of the control lever 31 so that the lever may readily be moved manually along the slot between the full and dotted line positions shown in Fig. 1.

Inside the casing, a depending tumbler arm 38 is swingably mounted on the pivot 32 and is connected to the control lever 31 by means of a contractile spring 39 hooked at its opposite ends through apertures 39a and 39b in the outer ends of the lever 31 and the arm 38, respectively. With this arrangement, the tumbler arm 38 will snap from side to side as the spring 39 is shifted over dead center by the control lever 31.

In order to form a connection between the tumbler arm 38 and the pawl 19 the exemplary embodiment includes a direction reversing lever 40 connected by means of a link 41 to an arm 42 formed integrally with the pawl. In the illustrated construction the direction reversing lever 40 is swingably mounted on a pivot 44 within the casing 30. To establish a pivotal connection between the lever 40 and the tumbler arm 38, the lower end of the spring 39 is hooked through a slot 46 formed in the upper end of the lever 40. The link 41 is connected between the lower end of the direction reversing lever 40 and the upper end of the arm 42.

If the driver of the tractor wishes to set and latch the tractor brakes, he will move the control lever 31 to its rearmost position, as shown in dotted lines in Fig. 1. A legend reading "Stop" may be inscribed on the casing, as shown in Fig. 2, to indicate that this is the brake latching position of the lever 31. This rearward movement of the lever 31 will shift the spring 39 over the center of the pivot 32, whereupon the tumbler arm 38 will be swung to the left. As a result, the pawl 19 will be moved against the ratchet plate 18 and will be held in this position by the resilient, biasing action of the spring 39. If the brake pedal 10 is then depressed, the pawl 19 will ratchet along the rack plate 18 and will hold the brake pedal against return movement.

To unlatch the brake pedal, the latching mechanism 16 may be released by swinging the control lever 31 to its most forward position as shown in Fig. 1. This will move the spring 39 over dead center and hence will snap the tumbler arm 38 forwardly so as to reverse the direction of the biasing action on the pawl 19. As a result, the pawl 19 will be moved away from the ratchet plate 18, and the brake pedal 10 will thereupon be free to return to its uppermost or brake releasing position. A legend reading "Go" may be inscribed on the casing adjacent the forward end of the slot 35 to indicate that this is the latch releasing position of the lever 31.

While the lever 31 may readily be shifted manually, there is little chance that it will be moved inadvertently. Thus, the latching mechanism is safe and virtually fool proof.

The modified embodiment of Figs. 4 and 5 is quite similar to the embodiment of Figs. 1–3, and the components of the modified embodiment have been given the same reference characters as the corresponding components of the first embodiment, with the addition of the prime superscript. In the modified embodiment, the brake pedal 10' extends forwardly from the brake shaft 11' rather than rearwardly, as in the first embodiment. The link 41' is connected directly between the lower end of the tumbler arm 38' and the upper end of the arm 42' on the pawl 19'. The direction reversing lever 40 is omitted. In this way the latching and releasing positions of the selector lever 31' will be the same as in the first embodiment. Accordingly, the lever 31' will be moved forwardly to unlatch the brakes and rearwardly to latch the brakes.

We claim as our invention:

In a brake system for a tractor, the combination comprising a pivotally mounted brake lever, a ratchet segment movable therewith, a pawl pivoted to rock into and out of engagement with said ratchet segment to lock and release said brake lever, a housing adapted to be mounted on the tractor, a manual control lever, a tumbler arm, a single stationary pivot within said housing mounting said control lever and tumbler arm to rock about a common axis, a tension spring connected between said control lever and said tumbler at points spaced from said pivot, there being an elongated slot in said housing through which said control lever projects and which defines stops at its opposite ends for limiting the rocking of said control lever, and link means projecting through said housing and connecting said tumbler arm with said pawl, movement of the control lever from one end of the slot to the other throwing the spring over center to thereby rock the tumbler arm and cause the pawl to swing into or out of engagement with the ratchet.

References Cited in the file of this patent

UNITED STATES PATENTS

| | | |
|---|---|---|
| 561,581 | Guett | June 9, 1896 |
| 1,218,028 | Williams | Mar. 6, 1917 |
| 1,320,339 | Norby | Oct. 28, 1919 |
| 1,328,899 | Ritter et al. | Jan. 27, 1920 |
| 1,540,247 | Bowman | June 2, 1925 |
| 1,823,695 | Moorhouse | Sept. 15, 1931 |
| 2,548,678 | Obenour | Apr. 10, 1951 |

FOREIGN PATENTS

| | | |
|---|---|---|
| 808,084 | Germany | July 9, 1951 |